(No Model.)

A. SANFORD.
HOOK.

No. 387,109. Patented July 31, 1888.

Witnesses,
Chas. R. Burr.
A. J. Stewart.

Inventor:
Albert Sanford
By Church & Church
his Attorneys.

UNITED STATES PATENT OFFICE.

ALBERT SANFORD, OF OSHKOSH, WISCONSIN.

HOOK.

SPECIFICATION forming part of Letters Patent No. 387,109, dated July 31, 1888.

Application filed June 2, 1887. Serial No. 240,081. (No model.)

*To all whom it may concern:*

Be it known that I, ALBERT SANFORD, of Oshkosh, in the county of Winnebago and State of Wisconsin, have invented certain new and useful Improvements in Hooks; and I do hereby declare the following to be a full, clear, and exact description of the same, reference being had to the accompanying drawings, forming a part of this specification, and to the figures and letters of reference marked thereon.

My present invention relates to certain improvements in hooks, particularly applicable to grab or chain hooks, and has for its object to produce a hook that will be lighter, stronger, and cheaper to make than those at present in use.

To this end the said invention consists in a hollow hook of the class described, together with certain details of construction, as will be hereinafter described, and pointed out particularly in the claims at the end of this specification.

Figure 1:
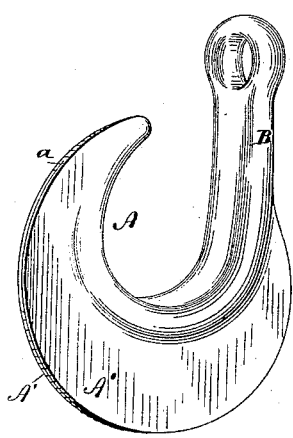
Figure 2:
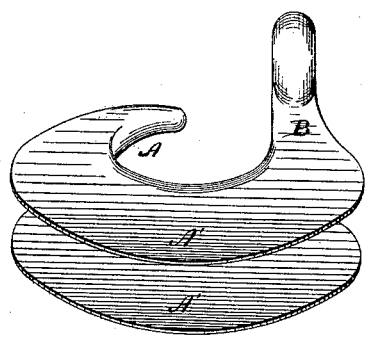
Figure 3:
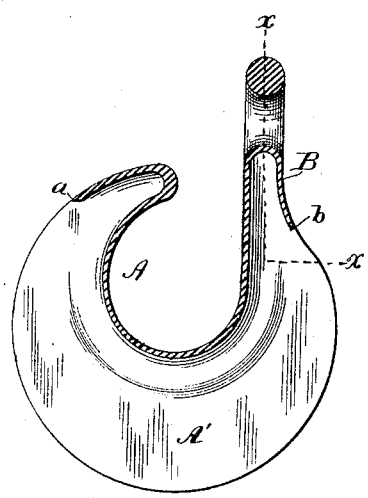
Figure 4:
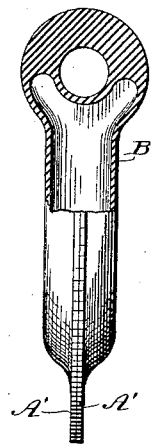

In the accompanying drawings, Figure 1 is a perspective view of a hook constructed in accordance with my invention. Fig. 2 is a view of the blank from which the completed hook is formed. Fig. 3 is a longitudinal section taken in the plane of the hook. Fig. 4 is a section on the line $x\ x$, Fig. 3.

Similar letters of reference in the several figures indicate the same parts.

Heretofore chain or grab hooks of this class have been usually formed of a solid bar of iron, preferably square or diamond shape in cross-section, bent into proper form in a plane taken through diagonally-opposite corners— as shown, for instance, in my prior Patent No. 222,203, December 2, 1879—or else have been cast in proper shape in the first place, always, however, being solid in cross-section.

In forming my present hook I cast it of malleable iron or steel or forge it into the following shape: the wearing-surface of the body portion A of the hook is curved, as shown, and the sides extended downward, forming the wings or flanges A′ A′. These wings or flanges are united from the point $a$ to the end of the hook and at $b$ in the shank B. This leaves them separate between these two points for the ready insertion of a mandrel for removal of the core when cast. The portion lying between point $a$ and the end of the hook, being conical, offers no obstruction to the practical manufacture of the blank and renders it somewhat less difficult to finish. The shank B is also hollow up to the eye, and, if desired, the eye, too, may be hollow throughout, although I preferably form it hollow only about half-way up, as shown in Fig. 4. This construction leaves the portion of the eye subjected to the greatest wear from the chain solid, while the portion practically free from wear is hollow. To complete the hook from the blank thus far described it is only necessary to bring the edges of the flanges A′ A′ together, which may be done either by hammering or by compressing them in suitable dies, after which, if desired, they may be fastened in any suitable manner or left simply sprung together.

Of course, if desired, the hook may be made thicker on the inner wearing-surface, and may be curved to suit the fancy of the manufacturer.

It will be at once apparent to those skilled in the art that the hook may be formed without separating the wings or flanges A′ A′ for such a length as shown in the drawings, and that the opening for the insertion of the mandrel or core or the removal of the core may be located at other points than between said flanges, and while I prefer the construction shown I do not wish to be limited thereto; nor do I wish to be limited to the employment of the hook in combination with the particular eye or fastening device shown, as any other suitable fastening device may be employed— such, for instance, as the swivel-connection shown in my before-mentioned patent; nor do I wish to be limited to the particular shape of hook shown, as it may be round, square, diamond, or other desired shape without departing from the spirit of my invention; but

What I claim as new, and desire to secure by Letters Patent, is—

1. The method of forming hooks herein described, consisting in producing a blank split open at the back of the hook portion proper, and then by pressure closing said split portion at or near the edges thereof to form a hollow hook, substantially as described.

2. The method of forming hooks herein described, consisting in producing a blank split open at the back of the hook portion proper, the edges of said split-open portion being extended in the form of flanges, and then by pressure bringing said flanges together to form a hollow hook, substantially as described.

3. The method of forming hooks herein described, consisting in producing the blank with a partially hollow eye and split open at the back of the hook portion proper, then by pressure closing said split portion at or near the edges thereof to form a hollow hook, substantially as described.

4. The method of forming hooks herein described, consisting in producing a blank with a partially hollow eye and split open at the back of the hook portion proper, the edges of said split-open portion being extended in the form of flanges, then by pressure bringing said flanges together to form a hollow hook, substantially as described.

5. As an improved article of manufacture, a hook formed with its body hollow throughout its entire length, and provided with the strengthening flange or rib at the back, substantially as described.

6. As an improved article of manufacture, a hook having the hollow body portion, and the eye for the attachment of the chain hollow throughout the portion adjacent to the body of the hook, substantially as described.

7. As an improved article of manufacture, a blank from which to form hollow hooks, the two sides of which are separated at the back on a line taken longitudinally through the hook, substantially as described.

ALBERT SANFORD.

Witnesses:
 C. R. NEVITT, Jr.,
 O. C. WEISBROD.